(12) United States Patent
Inoue et al.

(10) Patent No.: US 9,109,884 B2
(45) Date of Patent: Aug. 18, 2015

(54) METHOD AND EQUIPMENT FOR MANUFACTURING ELECTRIC RESISTANCE WELDED STEEL PIPE

(75) Inventors: Tomohiro Inoue, Kawasaki (JP);
Shigeto Sakashita, Kawasaki (JP);
Daijiro Yuasa, Kawasaki (JP); Hiroyasu Yokoyama, Chita (JP); Kazuhito Kenmochi, Chiba (JP); Yukinori Iizuka, Kawasaki (JP);

(73) Assignee: JFE Steel Corporation (JP)

( * ) Notice: Subject to any disclaimer, the term of this patent is extended or adjusted under 35 U.S.C. 154(b) by 852 days.

(21) Appl. No.: 12/526,971

(22) PCT Filed: Feb. 8, 2008

(86) PCT No.: PCT/JP2008/052592
§ 371 (c)(1),
(2), (4) Date: Sep. 22, 2009

(87) PCT Pub. No.: WO2008/099943
PCT Pub. Date: Aug. 21, 2008

(65) Prior Publication Data
US 2010/0059484 A1  Mar. 11, 2010

(30) Foreign Application Priority Data

Feb. 13, 2007 (JP) ................................ 2007-031714
Feb. 27, 2007 (JP) ................................ 2007-046802

(51) Int. Cl.
*B23K 11/00* (2006.01)
*B23K 11/34* (2006.01)
*G01B 11/25* (2006.01)
(Continued)

(52) U.S. Cl.
CPC ............... *G01B 11/25* (2013.01); *B21C 37/08* (2013.01); *B21C 37/083* (2013.01); *B23K 11/0873* (2013.01); *B23K 11/252* (2013.01);
(Continued)

(58) Field of Classification Search
None
See application file for complete search history.

(56) References Cited

U.S. PATENT DOCUMENTS 3,588,426 A * 6/1971 Harriau et al. ................... 219/67
3,610,876 A * 10/1971 Bhat ......................... 219/137 R
(Continued)

FOREIGN PATENT DOCUMENTS

DE  735 711  5/1943
JP  53-60543  5/1978
(Continued)

OTHER PUBLICATIONS

"Guidebook for the Fabrication of Non-Destructive Testing (NDT) Test Specimens", Training Course series No. 13, International Atomic Energy Agency, Jun. 2001.*
(Continued)

*Primary Examiner* — Johannes P Mondt
(74) *Attorney, Agent, or Firm* — DLA Piper LLP (US)

(57) ABSTRACT

A method for manufacturing an electric resistance steel pipe having a good toughness at a welded portion is provided, the method being capable of stably manufacturing an electric resistance welded steel pipe having a desirable toughness at a welded portion although a steel strip serving as a base material has a dimensional variation. Groove shapes and are applied to edges and of an open pipe, an edge shape monitor continuously captures images of the edges and immediately before electric resistance welding, and the captured images are input to an arithmetic processing unit for image processing.

4 Claims, 6 Drawing Sheets

(51) Int. Cl.
*B21C 37/08* (2006.01)
*B21C 37/083* (2006.01)
*B23K 11/087* (2006.01)
*B23K 11/25* (2006.01)
*B23K 33/00* (2006.01)

(52) U.S. Cl.
CPC .............. *B23K 11/34* (2013.01); *B23K 33/006* (2013.01); *B23K 2201/06* (2013.01); *B23K 2203/04* (2013.01)

(56) References Cited

U.S. PATENT DOCUMENTS

| | | | |
|---|---|---|---|
| 4,649,256 A | | 3/1987 | Minamida et al. |
| 4,908,491 A | * | 3/1990 | Knagenhjelm ................. 219/61 |
| 2009/0151457 A1 | | 6/2009 | Iizuka |

FOREIGN PATENT DOCUMENTS

| | | |
|---|---|---|
| JP | 57-195587 | 12/1982 |
| JP | 61-115686 A | 6/1986 |
| JP | 63-104797 | 5/1988 |
| JP | 4-105709 | 4/1992 |
| JP | 4-157074 A | 5/1992 |
| JP | 4-178281 A | 6/1992 |
| JP | 6-137853 | 5/1994 |
| JP | 2001-170779 A | 6/2001 |
| JP | 2007-160383 A | 6/2007 |
| JP | 2007-163470 A | 6/2007 |

OTHER PUBLICATIONS

Corresponding Supplementary European Search Report dated Mar. 11, 2015 of European Application No. 08711419.5.

* cited by examiner

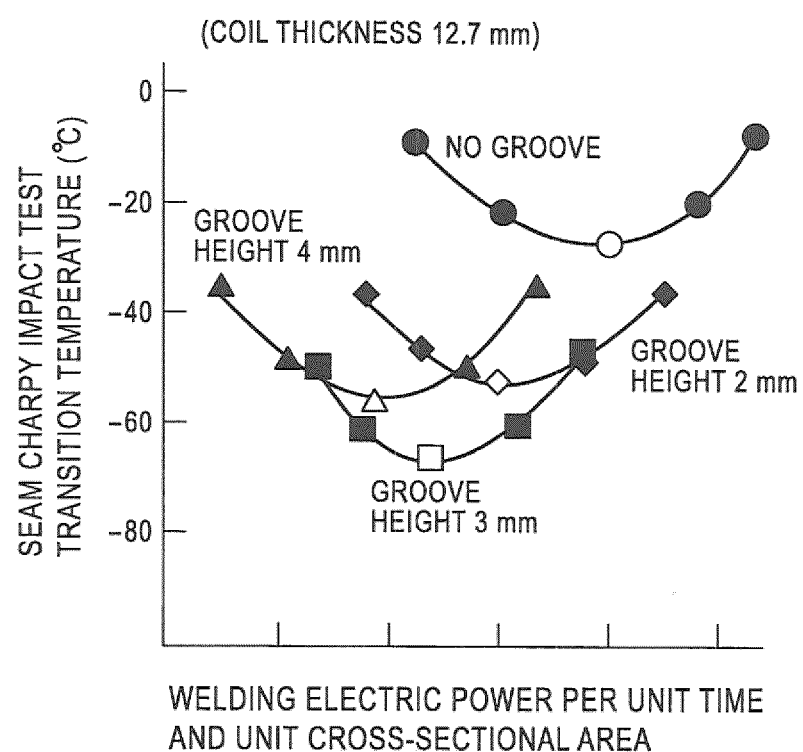

METHOD AND EQUIPMENT FOR MANUFACTURING ELECTRIC RESISTANCE WELDED STEEL PIPE

RELATED APPLICATIONS

This is a §371 of International Application No. PCT/JP2008/052592, with an international filing date of Feb. 8, 2008 (WO 2008/099943 A1, published Aug. 21, 2008), which is based on Japanese Patent Application Nos. 2007-031714, filed Feb. 13, 2007, and 2007-046802, filed Feb. 27, 2007.

TECHNICAL FIELD

This disclosure relates to a method and equipment for manufacturing an electric resistance welded steel pipe which is used as a pipeline for oil, natural gas and the like.

BACKGROUND

Required characteristics of steel pipes (line pipes) used as natural gas pipelines have become strict, and the demand of steel pipes with a high toughness in ultracold temperatures has been increased so as to withstand a cryogenic condition ($\leq -45°$ C.).

Steel pipes have been frequently used as line pipes; however, the steel pipes have been hardly actually used to meet the demand of the high toughness at the ultracold temperatures because the quality of a seam (electric resistance welded portion) is not enough. Very small oxide may be generated during electric resistance welding and remain within the seam (welded portion) even after the welding is completed. This may decrease an absorbed energy of a steel pipe when a Charpy impact test is carried out at an ultracold temperature. Hence, a necessary toughness is not stably obtained.

Conventionally, various trials have been made to decrease the remaining very small oxide. A typical technique is sealed welding in which welding equipment and a portion of a steel pipe near a welded portion are enclosed, and electric resistance welding is carried out while oxygen concentration is lowered by way of inert gas or the like (for example, see Japanese Unexamined Patent Application Publication No. 4-178281).

The above-mentioned technique, sealed welding, in which the welding equipment and the periphery thereof are enclosed to be sealed from the ambient air and filled with the inert gas instead, is widely practically used in a mill for manufacturing a small-diameter pipe with an outer diameter of $\phi 165$ mm or smaller. As the outer diameter is increased, the welding equipment is increased in size, and hence a sealed region has to be increased. It is industrially difficult to be completely sealed. Thus, sealed welding is hardly practically used in a mill for manufacturing a middle-diameter pipe or a large-diameter pipe with an outer diameter larger than $\phi 165$ mm.

In light of this, we have suggested a method for manufacturing an electric resistance welded steel pipe in Japanese Unexamined Patent Application Publication No. 2007-160383 (application date of which is later than the priority date of the subject application). The method can provide an electric resistance welded steel pipe with a high toughness even at ultracold temperatures without sealed welding.

In particular, the electric resistance welded steel pipe is manufactured such that a steel strip cut into a predetermined width is continuously shaped by roll forming to obtain a substantially tubular open pipe, and both edges of the open pipe are welded by electric resistance welding. More specifically, high-frequency current is applied to the edges of the open pipe, thereby generating Joule heat, the edges are heated and melted with the Joule heat, and then the edges are joined and pressure-welded.

At this time, during conventional electric resistance welding, edges of the open pipe have a merely rectangular shape as shown in FIG. 8A. Current may be concentrated at positions near outer and inner surfaces of the edges, whereas the current density is low at a center portion in a strip-thickness direction. Unevenness of the current density in the strip-thickness direction may directly result in temperature distribution being uneven. Further, since the temperature at the center portion in the strip-thickness direction is low, this phenomenon may be an essential factor that leads a discharge failure of oxide.

Thus, referring to a cross-sectional shape shown in FIG. 8B, Japanese Unexamined Patent Application Publication No. 2007-160383 provides a configuration in which a predetermined tapered shape (groove shape) is applied to corner portions at the outer and inner surfaces of the edges of the open pipe, to address the unevenness in the current density in the strip-thickness direction, to efficiently discharge the oxide from the welded portion, and to provide the electric resistance welded steel pipe with a high toughness at ultracold temperatures.

In an actual operation, however, the groove shapes of the edges may not achieve the predetermined shape because of a dimensional variation such as a camber (curve), or strength unevenness, of a steel strip serving as a base material. In such a case, the temperature distribution may vary at the welded portion, the electric resistance welded steel pipe with a desirable toughness may not be stably manufactured.

It could therefore be helpful to provide a method for manufacturing an electric resistance welded steel pipe having a good toughness at a welded portion, the method being capable of stably manufacturing an electric resistance welded steel pipe having a desirable toughness at a welded portion although a steel strip serving as a base material has a dimensional variation.

SUMMARY

We thus provide the following:

[1] A method for manufacturing an electric resistance welded steel pipe having a good toughness at a welded portion is provided, the method including the steps of shaping a steel strip into a substantially tubular open pipe and welding both edges of the open pipe by electric resistance welding. The method comprises the steps of: previously applying a groove shape to each of the edges of the open pipe; measuring the groove shape before the electric resistance welding; and adjusting a welding electric power for the electric resistance welding on the basis of the measurement result.

[2] The method for manufacturing an electric resistance welded steel pipe having a good toughness at a welded portion according to [1], further comprises the steps of before manufacturing the electric resistance welded steel pipe, obtaining a relationship between a toughness and a welding electric power for a groove height of a groove shape, and obtaining a relationship between a groove height and a welding electric power with which a desirable toughness is obtained on the basis of the relationship between the toughness and the welding electric power; then, during manufacturing the electric resistance welded steel pipe, measuring a groove height of the applied groove shape, obtaining a welding electric power with which a desirable toughness is obtained for the measured groove height on the basis of the measured groove height and a relationship between the groove height and the welding electric power with which the desirable toughness is obtained, and adjusting the welding electric power for the electric resistance welding on the basis of the obtained welding electric power.

[3] In the method for manufacturing an electric resistance welded steel pipe having a good toughness at a welded portion according to [1] or [2], the groove shape is measured by irradiating the edge of the open pipe with laser slit light, and capturing an image of the edge of the open pipe irradiated with the laser slit light by a camera.

[4] In the method for manufacturing an electric resistance welded steel pipe having a good toughness at a welded portion according to any of [1] to [3], the step of previously applying the groove shape to the edge of the open pipe is one of the steps including applying the groove shape by an edge cutting tool, applying the groove shape by a roll forming device, and applying the groove shape by a grooved roll.

[5] Equipment for manufacturing an electric resistance welded steel pipe is provided, the equipment including open pipe shaping means for shaping a steel strip into a substantially tubular open pipe, and electric resistance welding means for welding both edges of the open pipe by electric resistance welding. The equipment comprises: groove shape applying means for previously applying a groove shape to each of the edges of the open pipe; groove shape measuring means for measuring the groove shape before the electric resistance welding; and a power conditioning device for adjusting a welding electric power for the electric resistance welding on the basis of the measurement result.

[6] In the equipment for manufacturing an electric resistance welded steel pipe according to [5], the groove shape measuring means includes an irradiation device which irradiates the edge of the open pipe with laser slit light; an imaging device which captures an image of the edge of the open pipe irradiated with the laser slit light of the irradiation device; and an image processing device which processes the captured image of the imaging device by image processing and detects the groove shape.

[7] In the equipment for manufacturing an electric resistance welded steel pipe according to [5] or [6], the power conditioning device obtains a welding electric power with which a desirable toughness is obtained for the measured groove height on the basis of the groove height measured by the groove shape measuring means and a previously obtained relationship between a groove height and a welding electric power with which a desirable toughness is obtained, and adjusts the welding electric power for the electric resistance welding on the basis of the obtained welding electric power.

[8] A method for manufacturing an electric resistance welded steel pipe having a good toughness at a welded portion is provided, the method including the steps of shaping a steel strip into a substantially tubular open pipe and welding both edges of the open pipe by electric resistance welding. The method comprises the step of: previously applying a groove shape to each of the edges of the open pipe; measuring the groove shape before the electric resistance welding; measuring a quantity of oxide at the welded portion after the electric resistance welding; and adjusting a welding electric power for the electric resistance welding on the basis of the measurement results.

[9] The method for manufacturing an electric resistance welded steel pipe having a good toughness at a welded portion according to [8], further comprises the steps of: before manufacturing the electric resistance welded steel pipe, obtaining a relationship between a toughness and a welding electric power for a groove height of a groove shape, obtaining a relationship between a groove height and a welding electric power with which a desirable toughness is obtained on the basis of the relationship between the toughness and the welding electric power, obtaining a relationship between a welding electric power and a quantity of oxide, and obtaining a relationship between a quantity of oxide and a modification coefficient of a welding electric power on the basis of the relationship between the welding electric power and the quantity of oxide; then, during manufacturing the electric resistance welded steel pipe, measuring a groove height of the applied groove shape before the electric resistance welding, obtaining a welding electric power with which a desirable toughness is obtained for the measured groove height on the basis of the measured groove height and the relationship between the groove height and the welding electric power with which the desirable toughness is obtained, and adjusting the welding electric power for the electric resistance welding on the basis of the obtained welding electric power; and measuring the quantity of oxide after the electric resistance welding, obtaining a modification coefficient of the welding electric power for the measured quantity of oxide on the basis of the measured quantity of oxide and the relationship between the quantity of oxide at the welded portion and the modification coefficient of the welding electric power, and adjusting the welding electric power for the electric resistance welding on the basis of the obtained modification coefficient of the welding electric power.

[10] In the method for manufacturing an electric resistance welded steel pipe having a good toughness at a welded portion according to [8] or [9], the groove shape is measured by irradiating the edge of the open pipe with laser slit light, and capturing an image of the edge of the open pipe irradiated with the laser slit light by a camera.

[11] In the method for manufacturing an electric resistance welded steel pipe having a good toughness at a welded portion according to any of [8] to [10], the quantity of oxide at the welded portion is measured by using ultrasonic.

[12] In the method for manufacturing an electric resistance welded steel pipe having a good toughness at a welded portion according to any of [8] to [11], the step of previously applying the groove shape to the edge of the open pipe is one of the steps including applying the groove shape by an edge cutting tool, applying the groove shape by a roll forming device, and applying the groove shape by a grooved roll.

[13] Equipment for manufacturing an electric resistance welded steel pipe is provided, the equipment including open pipe shaping means for shaping a steel strip into a substantially tubular open pipe, and electric resistance welding means for welding both edges of the open pipe by electric resistance welding. The equipment comprises: groove shape applying means for previously applying a groove shape to each of the edges of the open pipe; groove shape measuring means for measuring the groove shape before the electric resistance welding; oxide quantity measuring means for measuring a quantity of oxide at the welded portion after the electric resistance welding; and a power conditioning device for adjusting a welding electric power for the electric resistance welding on the basis of the measurement results of the groove shape measuring means and oxide quantity measuring means.

BRIEF DESCRIPTION OF THE DRAWINGS

FIG. 3 is an illustration showing how to create a welding power optimization curve.

Figure 1A:
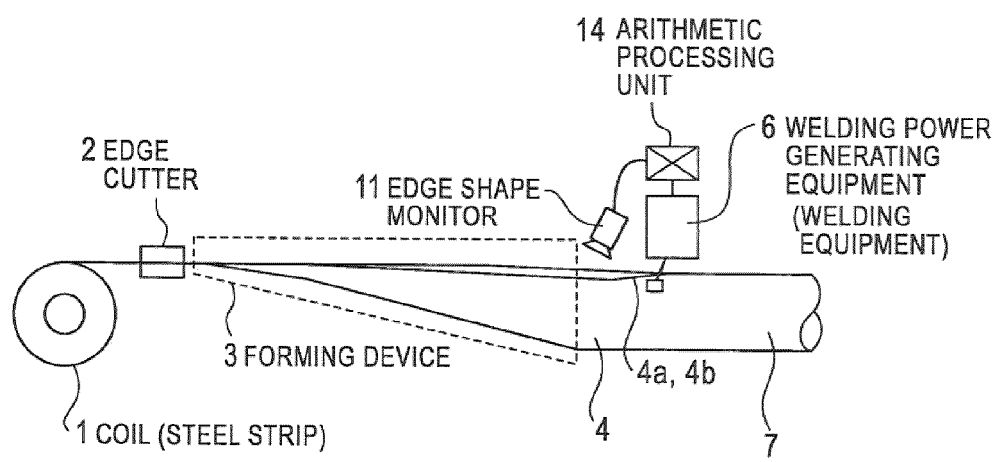
FIGS. 1A and 1B is an illustration showing selected aspects of our method and apparatus.

REFERENCE NUMERALS 1 steel strip (coil)
2 edge cutter
3 roll forming device
4 open pipe
4a, 4b edge of open pipe
5a, 5b groove shape
6 welding power generating equipment (welding equipment)
7 electric resistance welded steel pipe
11 edge shape monitor
12, 12a, 12b irradiation device (with laser slit light)
13, 13a, 13b image measurement camera
14 arithmetic processing unit
15 ultrasonic flaw detector

DETAILED DESCRIPTION

Selected aspects of our methods and apparatus will be described below with reference to the drawings.

FIG. 1A illustrates an exemplary manufacturing line for an electric resistance welded steel pipe.

Similarly to a typical manufacturing line for an electric resistance welded steel pipe, edges of a coil (steel strip) 1 cut into a predetermined width are cut by an edge cutter 2, the coil 1 is continuously shaped by a roll forming device 3 to be a substantially tubular open pipe 4, and both edges 4a and 4b of the open pipe 4 are welded by electric resistance welding. In particular, high-frequency current is applied to the edges 4a and 4b of the open pipe 4 by welding power generating equipment (welding equipment) 6, thereby generating Joule heat, the edges 4a and 4b are heated and melted, and then the edges 4a and 4b are joined and pressure-welded by a squeeze roll (not shown). Thusly, an electric resistance welded steel pipe 7 is manufactured. Also, a bead cutting tool (not shown) is provided downstream of electric resistance welding equipment (the welding power generating equipment 6 and the squeeze roll) at a position close to the equipment. The bead cutting tool cuts bead (excess metal) formed by the electric resistance welding.

Figure 8A:
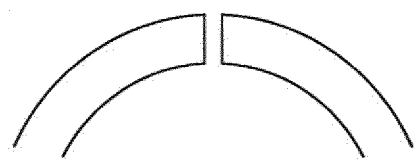
FIG. 8A is an illustration showing a case where an edge of an open pipe has a rectangular shape.
Figure 8B:
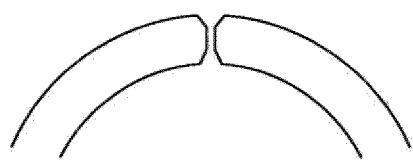
FIG. 8B is an illustration showing a case where an edge has a groove shape.

Then, corner portions at outer and inner surfaces of both ends in a width direction of the steel strip 1 are tapered by the edge cutter 2, the roll forming device 3, and a grooved roll (not shown) for properly processing both edges 4a and 4b. Hence, a groove shape (tapered shape) as shown in FIG. 8B is applied to each of the edges 4a and 4b. Also, edge shape monitors (high-accuracy monitor cameras) 11 continuously capture images of the edges 4a and 4b immediately before the electric resistance welding. The captured images are input to an arithmetic processing unit 14 in real time for image processing. With the image processing, a subtle variation in the groove shape is measured, an optimum welding electric power is obtained on the basis of the measurement result (dimensional data), and a welding electric power from the welding power generating equipment 6 is adjusted.

Figure 1B:
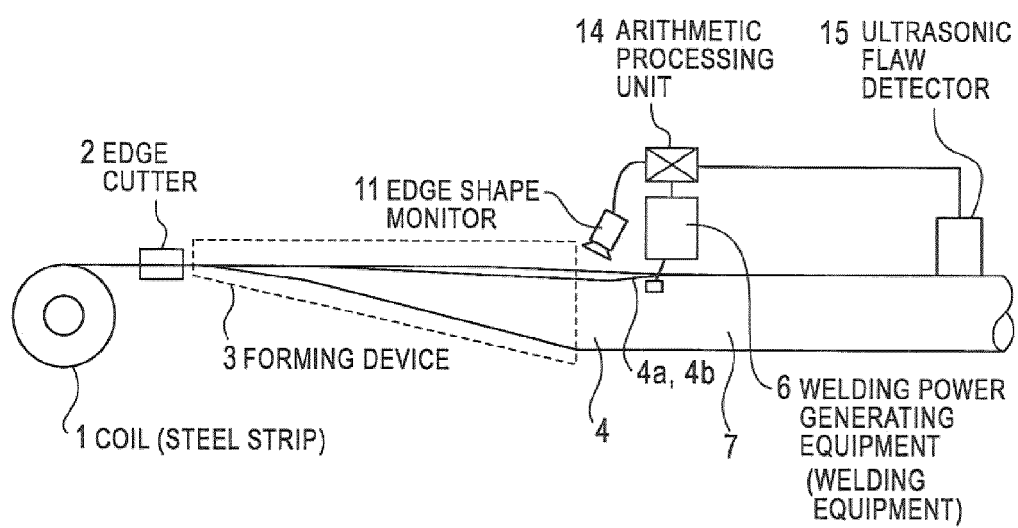

FIG. 1B shows a manufacturing line for an electric resistance welded steel pipe. In addition to the configuration of the aspect shown in FIG. 1A, an ultrasonic flaw detector 15 is provided. After the electric resistance welding, the ultrasonic flaw detector 15 inspects the welded portion (a welded portion corresponding to a position where the groove shape has been measured). The inspection data is input to the arithmetic processing unit 14 in real time for arithmetic processing. With the arithmetic processing, an oxide distribution at the welded portion is measured, an optimum welding electric power is obtained on the basis of the measurement result of the groove shape (dimensional data) and the measurement result of the oxide distribution (quantity of oxide), and a welding electric power from the welding power generating equipment 6 is adjusted.

Figure 2A:
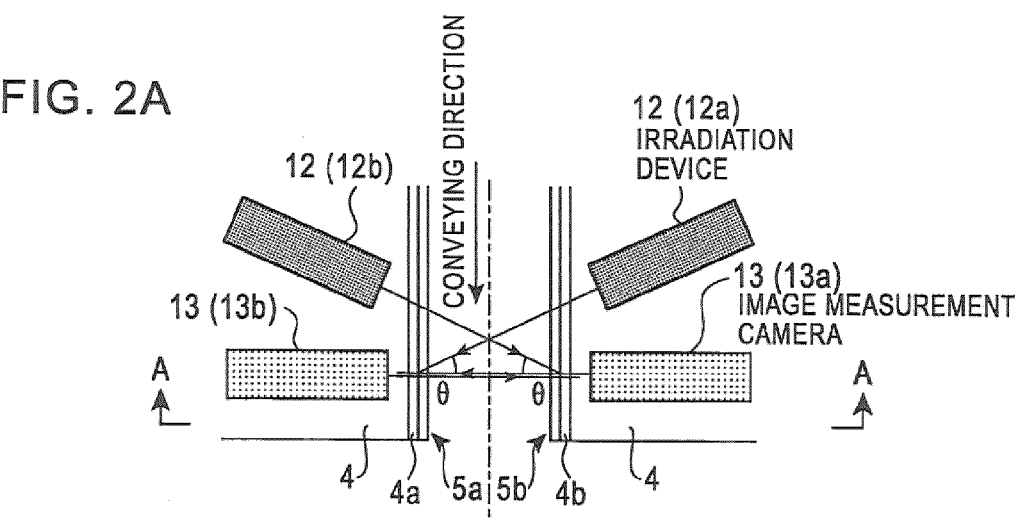
FIG. 2A is a top view showing details of part of apparatus.
Figure 2B:
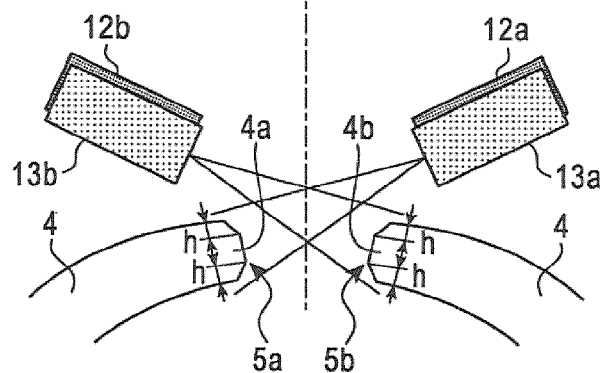
FIG. 2B is a cross-sectional view of FIG. 2A.

FIGS. 2A and 2B are detailed explanatory views showing the measurement of the groove shape by the edge shape monitor 11. FIG. 2A is a top view, and FIG. 2B is a view (cross-sectional view) taken along line A-A in FIG. 2A.

Referring to the drawing, the edge shape monitor 11 is a combination (optical cutting device) of an irradiation device (with laser slit light) 12 and an image measurement camera 13. Here, the edge shape monitor 11 includes an irradiation device (with laser slit light) 12a which irradiates one edge 4a of the open pipe 4 with laser slit light obliquely at a predetermined irradiation angle θ, an image measurement camera 13a which captures an image of the edge 4a irradiated with the laser slit light, an irradiation device 12b which irradiates the other edge 4b of the open pipe 4 with laser slit light obliquely at a predetermined irradiation angle θ, and an image measurement camera 13b which captures an image of the edge 4b irradiated with the laser slit light.

The image measurement cameras 13a and 13b capture the images of the edges 4a and 4b irradiated with the laser slit light from the irradiation devices (with laser slit light) 12a and 12b. The arithmetic processing unit 14 processes the captured images to measure groove shapes 5a and 5b of the edges 4a and 4b. In particular, groove heights h at four positions as shown in FIG. 2B are measured.

In the aspect shown in FIG. 1B, the ultrasonic flaw detector 15 is used to measure the quantity of oxide after the electric resistance welding, at the positions for measuring the groove shapes in the above-described manner.

As described above, the optimum welding electric power is obtained on the basis of the measurement result of the groove height h, and adjusts the welding electric power from the welding power generating equipment 6. Alternatively, the optimum welding electric power is calculated on the basis of the measurement result of the groove height h and a measurement result of a quantity of oxide at the welded portion, and adjusts the welding electric power from the welding power generating equipment 6. The basic idea will be described below.

FIG. 3 shows an example relationship between a welding electric power (in FIG. 3, being converted into a welding electric power per unit time and unit cross-sectional area, the unit being kW/(sec·mm$^2$)) and a toughness (seam Charpy impact test transition temperature) at a seam, with groove heights h used as parameters, in a case where an electric resistance welded steel pipe is manufactured by applying the groove shapes 5a and 5b to the edges 4a and 4b of the open pipe 4. Herein, the toughness at the seam is expressed by the seam Charpy impact test transition temperature (hereinafter, merely referred to as transition temperature), the coil thickness t is 12.7 mm, and the groove height h varies from 2 mm, 3 mm, to 4 mm. For comparison, a structure having no groove shape (no groove) is also shown. FIG. 3 shows the relationship between the welding electric power and the toughness qualitatively, and the values of the welding electric power are omitted.

Referring to FIG. 3, the transition temperature is greatly lowered, the toughness is markedly increased, and hence the groove shape is effective when the groove shape is provided as compared with the case where no groove shape is provided.

It is to be noted that the welding electric power with which the transition temperature becomes the lowest (white dot in FIG. 3) with the same groove height varies in accordance with the groove height. In other words, although electric resistance welding is carried out with a welding electric power which is optimum for a certain groove height, if the groove height varies, the welding electric power becomes deviated from the optimum welding electric power. The toughness (transition temperature) may be significantly changed.

Hence, a welding electric power W is adjusted to be the welding electric power optimum for the groove height h in accordance with the variation in the groove height h, thereby minimizing the variation in toughness (transition temperature).

Figure 4:
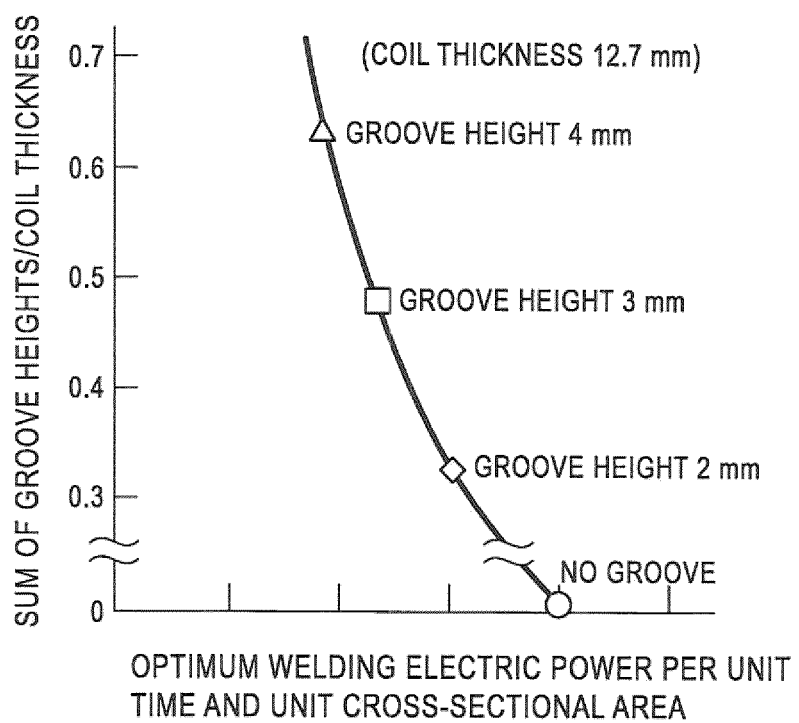
FIG. 4 is an illustration showing an example of the welding power optimization curve.

In particular, referring to FIG. 4, the horizontal axis represents the optimum welding electric power W (in FIG. 4, being converted into a welding electric power per unit time and unit cross-sectional area, the unit being kW/(sec·mm$^2$)), and the vertical axis represents (sum of groove heights 2h)/(coil thickness t). A curve obtained by plotting the welding electric power with which the transition temperature becomes the lowest (white dot in FIG. 3) is a welding electric power optimization curve (welding electric power correction curve) in association with the variation in the groove height h. Then, the welding electric power optimum for the groove height h is obtained from the welding electric power optimization curve on the basis of the measurement result of the groove height h. The obtained welding electric power W is set to the optimum welding electric power. FIG. 4 shows the optimum welding electric power and the vertical axis representing (sum of groove heights 2h)/(coil thickness t) qualitatively, and the values of the optimum welding electric power are omitted.

Alternatively, the welding electric power W may be set to a welding electric power optimum for a groove height hm (for example, 3 mm) which is an initial target value (i.e., in FIG. 4, a value at a groove height of 3 mm is set as an origin), and the welding electric power W may be corrected by a deviation of the optimum welding electric power to correspond to a shift of the groove height.

The welding power optimization curve (welding power correction curve) in FIG. 4 is previously created before the manufacturing (operating) of the electric resistance welded steel pipe is started. To manufacture a same type of electric resistance welded steel pipes, the same welding power optimization curve (welding power correction curve) is used.

Even with the above-mentioned control, however, very small oxide may remain at the welded portion due to a variation in operating condition or the like. The oxide may decrease the toughness.

Hence, to further stably manufacture an electric resistance welded steel pipe having a desirable toughness at a welded portion, a quantity of oxide at the welded portion after the electric resistance welding is measured, the measurement result is fed back to the welding power generating equipment 6 through the arithmetic processing unit 14 to adjust the welding electric power and to stably decrease the quantity of oxide at the welded portion. At this time, when the quantity of oxide is large, the welding electric power is typically increased so that floating and removal of the oxide are promoted.

Means for measuring the quantity of oxide at the welded portion (in particular, the quantity of very small oxide (several hundreds of micrometers or smaller), which may affect the toughness of the welded portion) may employ known means. For example, the known means may be an ultrasonic flaw detection method using an array type probe, disclosed in Japanese Unexamined Patent Application Publication No. 2007-163470 (application date of which is later than the priority date of the subject application), or may be another method disclosed in the publication.

A feed back method when the ultrasonic flaw detection method using the array type probe is employed will be described.

Figure 5:
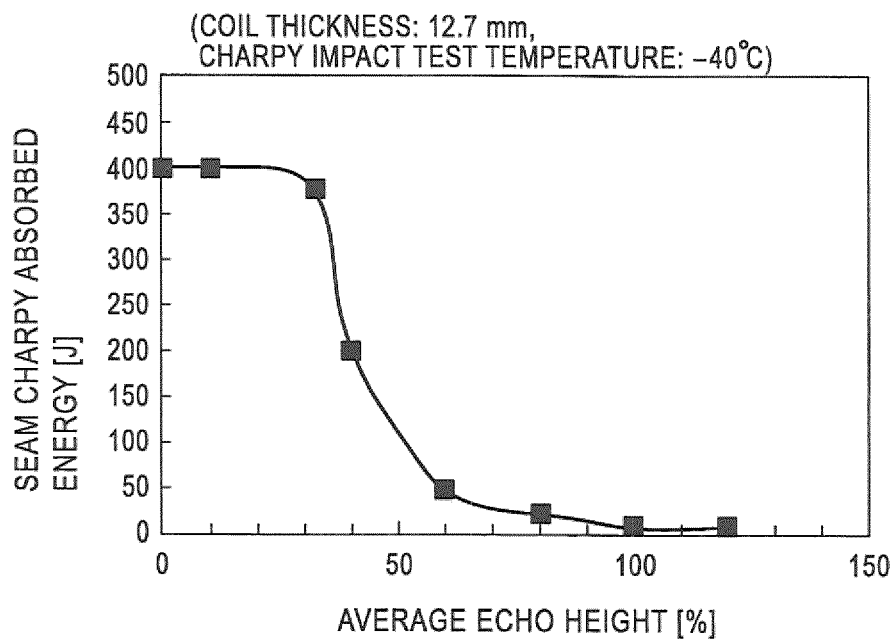
FIG. 5 is an illustration showing how to correct a welding electric power.

FIG. 5 illustrates an example relationship between a measurement value (average echo height (%)) of the ultrasonic flaw detector 15 and an absorbed energy. The measurement value (average echo height (%)) correlates with the quantity of very small oxide. In this example, the quantity of oxide at the welded portion is small and the sufficient toughness can be obtained as long as the average echo height is in a range of from 0% to 20%.

Figure 6:
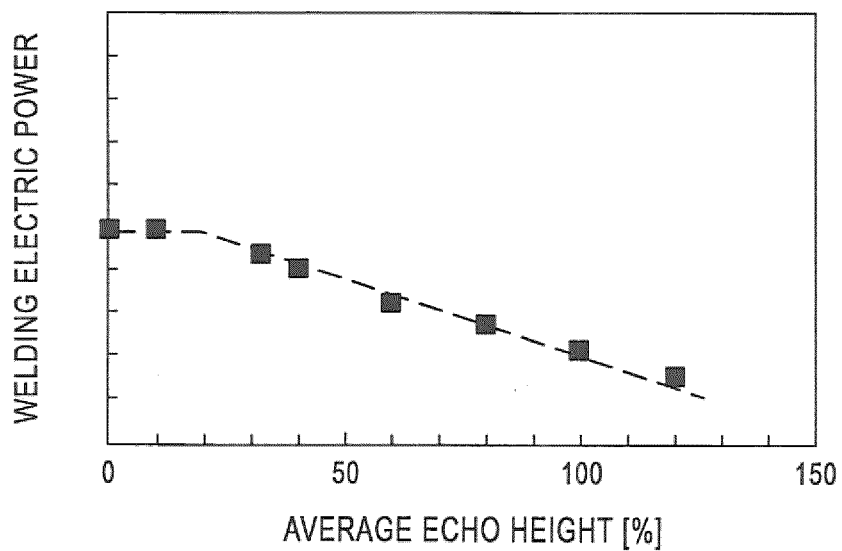
FIG. 6 is an illustration showing how to calculate a modification coefficient of the welding electric power.

Therefore, a relationship between an average echo height (=quantity of oxide) at the welded portion after the electric resistance welding under various conditions (material shape, material quality, pipe forming speed, and the like) with the welding electric power set in FIG. 4, and a welding electric power (the unit being kW/(sec·mm$^2$)), is previously obtained as shown in FIG. 6. FIG. 6 shows the relationship between the average echo height and the welding electric power qualitatively, and the values of the welding electric power are omitted.

Referring to an example in FIG. 5, when the high toughness can be maintained because the average echo height is about 20% or lower, a reference value of the average echo height is determined to 20%. Then, a modification coefficient of the welding electric power when the average echo height is x % is obtained by the equation as follows:

Modification coefficient=(welding electric power)$_{echo\ height=20\%}$/(welding electric power)$_{echo\ height=x\ \%}$.

Herein, (welding electric power)$_{echo\ height=20\%}$ is a welding electric power when the average echo height is 20% in FIG. 6, and (welding electric power)$_{echo\ height=x\ \%}$ is a welding electric power when the average echo height is x % in FIG. 6.

Figure 7:
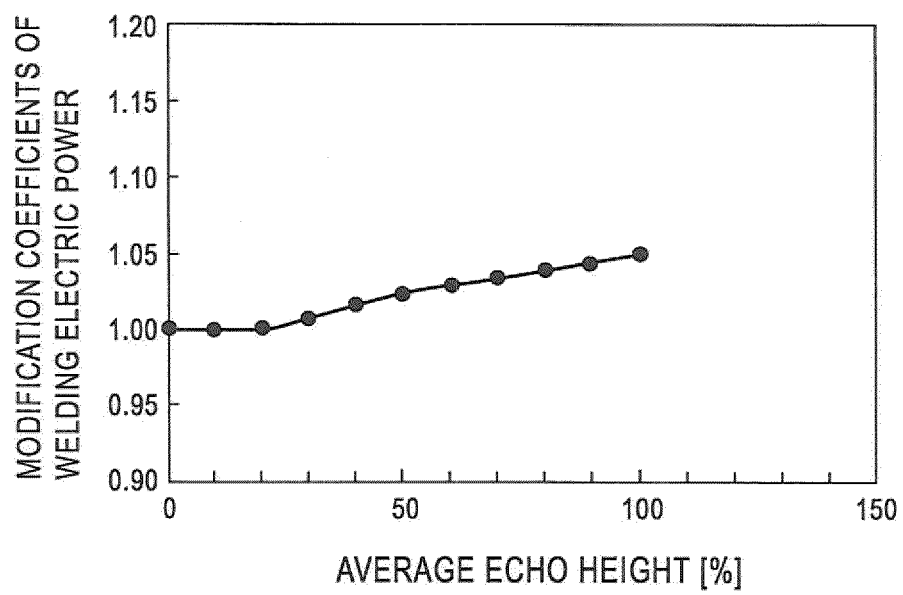
FIG. 7 is an illustration showing an example of the modification coefficient of the welding electric power.

FIG. 7 shows a relationship between the average echo height obtained in the above-described manner and the modification coefficient.

The modification coefficient of the welding electric power in FIG. 7 is previously created before manufacturing (operating) of the electric resistance welded steel pipe is started. To manufacture a same type of electric resistance welded steel pipes, the same modification coefficient is used.

For example, when the average echo height is 100% at the welded portion after the electric resistance welding is carried out with the welding electric power set under a certain condition, it is found in FIG. 7 that the modification coefficient is 1.05. Hence, the set welding electric power is multiplied by 1.05. It is to be noted that when the measured average echo height is in a range of from 0% to 20%, the welding condition does not have to be modified (modification coefficient=1).

The quantity of oxide is preferably measured by the ultrasonic flaw detector 15 immediately after the electric resistance welding. More particularly, the ultrasonic flaw detector 15 is preferably arranged immediately downstream of the bead cutting tool, because a time lapses as the position of the ultrasonic flaw detector 15 is apart from the electric resistance welding equipment, and the accuracy of information for feedback is decreased.

The above-described control method is merely an example. Of course, other means, such as means for tuning the welding electric power such that the average echo height falls within the range of from 0% to 20%, can be employed.

In this way, the welding electric power can be optimized by combining the feed-forward control based on the measurement result of the groove height h and the feedback control based on the measurement result (average echo height) of the quantity of oxide.

As described above, the edges 4a and 4b of the open pipe 4 have the groove shapes (tapered shapes) 5a and 5b, so that the current density, or the temperature distribution, in the strip-thickness direction during the electric resistance welding is equalized, the quantity of very small oxide at the seam after the electric resistance welding is decreased, and hence the high toughness at ultracold temperatures can be obtained. Also, the variation of the groove shapes 5a and 5b is measured, and the welding electric power is adjusted to a welding electric power optimum for the groove shapes 5a and 5b. Accordingly, even when the groove shapes 5a and 5b vary by an unavoidable factor such as a dimensional variation or a strength unevenness of the steel strip 1 serving as a base material, the toughness at the welded portion is prevented from varying, and an electric resistance welded steel pipe with a desirable toughness (in particular, an electric resistance welded steel pipe applicable to the use at ultracold temperatures, the pipe which has had difficulty in manufacturing) can be stably manufactured.

Furthermore, the quantity of oxide at the welded portion is measured, and the welding electric power is adjusted to a welding electric power optimum for the groove shapes 5a and 5b. Hence, an electric resistance welded steel pipe with a further stable toughness can be manufactured.

In an actual operation, once manufacturing is started, the groove shapes 5a and 5b of the continuously fed coil 1 or open pipe 4 cannot be manually measured. Even if the groove shapes 5a and 5b can be measured, as long as the system is not provided for automatically changing the welding electric power for the welding equipment 6 in real time, no advantage is attained in industrial manufacturing. Thus, the utility of our method and apparatus is markedly high.

The groove shapes 5a and 5b may be applied by the edge cutter 2, the roll forming device 3 (for example, with a fin pass roller provided therein), or a grooved roll (not shown). The groove shapes 5a and 5b may be preferably applied at a position maximally close to the welding equipment 6 so that the dimensional accuracy is increased.

The measurement of the groove shapes 5a and 5b may only include measurement of groove heights at one of surfaces of the open pipe 4 (for example, outer surface). In this case, the vertical axis in FIG. 4 may be expressed by (groove height h of one of measured groove shapes)/(coil thickness t).

The measurement of the groove shapes 5a and 5b does not have to use the irradiation devices (with laser slit light) 12. The images of the edges 4a and 4b of the open pipe 4 may be captured with the image measurement cameras 13, and the groove height h may be calculated by using shades of the captured images.

The groove shape may be applied to one of outer and inner surfaces of the open pipe 4.

The welding power optimization curve (welding power correction curve) shown in FIG. 4 as an example may be stored in the arithmetic processing unit 14, as an experimental equation, or as a database including parameters which may be the groove height, the ratio of the groove height to the coil thickness, and the welding electric power. The measured groove height may be substituted into the experimental equation to calculate the welding electric power, or the measured groove height may refer to the database to calculate the welding electric power (by interpolating the value of the database if necessary). The same can be applied to the modification coefficient (modification coefficient curve) using the oxide (average echo height) shown in FIG. 7 as an example.

In the above-described aspect, while the welding power optimization curve (welding power correction curve) in FIG. 4 is created on the basis of the welding electric power with which the transition temperature becomes the lowest in FIG. 3, this disclosure is not limited thereto. For example, the welding power optimization curve (welding power correction curve) may be created on the basis of a range of a welding electric power corresponding to a transition temperature at which a desirable toughness (for example, a specification requested for an electric resistance welded steel pipe) can be obtained. In this case, the welding power optimization curve (welding power correction curve) may have a band shape. The welding electric power is adjusted within the band-shape range. The same can be applied to the modification coefficient (modification coefficient curve) using the oxide (average echo height) shown in FIG. 7 as an example.

INDUSTRIAL APPLICABILITY

Our method and apparatus is industrially useful because it can stably manufacture the electric resistance welded steel pipe (in particular, an electric resistance welded steel pipe applicable to the use at ultracold temperatures, the pipe which has had difficulty in manufacturing) being capable of preventing the toughness at the welded portion from varying and having the desirable toughness even when the groove shape applied to the edge of the open pipe varies due to the unavoidable factor such as the dimensional variation and the intensity unevenness of the steel strip serving as the base material, in an actual operation for mass production.

The invention claimed is:

1. A method of operating an electric resistance welded steel pipe manufacturing line comprising:
    (a) producing sample open, substantially tubular steel pipes from a steel strip as a testing sample by roll forming, said open, substantially tubular steel pipes each having an opening and two proximate, opposing edges adjacent to said opening, and having sample groove shapes having a sample groove height, said sample groove shapes being applied to each edge by tapering corner portions at inner and outer tubular surfaces of each one of said edges, and measuring said sample groove height;

establishing through measurements obtained by variation of sample groove height an adjustment of a setting of a level of electric welding power to a value at which the seam Charpy test transition temperature is minimal as a function of said electric welding power, thereby establishing a relationship between groove height and welding electric power at which toughness of a weld is optimal;

and (b) producing an electric resistance welded steel pipe as a product based upon said relationship according to the following steps:

(i) forming an open, substantially tubular product pipe from a steel strip by roll forming as a product source, said open, substantially tubular steel pipe having an opening and two proximate, opposing edges adjacent to said opening, and having product groove shapes having a product groove height, said product groove shapes being applied to each edge by tapering corner portions at inner and outer tubular surfaces of each one of said edges;

(ii) measuring said product groove height;

(iii) obtaining a setting of a value of welding power at which toughness is optimal based on the measured product groove height and said relationship as obtained in step (a);

(iv) welding both edges of the open, substantially tubular steel product pipe by electric resistance welding, wherein the welding power is set to said value at which toughness is optimal for the measured product groove height.

2. The method according to claim 1, wherein the sample and product groove shapes are measured by irradiating an edge of the open pipe with laser slit light, and capturing an image of the edge of the open pipe irradiated with the laser slit light with a camera.

3. The method according to claim 1, wherein the sample and product groove shapes are applied by using one of an edge cutting tool, a roll forming device, and a grooved roll.

4. The method according to claim 2, wherein the sample and product groove shapes are applied by using one of an edge cutting tool, a roll forming device, and a grooved roll.

* * * * *